US010860761B1

(12) United States Patent
Vanukuri et al.

(10) Patent No.: US 10,860,761 B1
(45) Date of Patent: Dec. 8, 2020

(54) SYSTEMS AND METHODS FOR ENHANCED CLOCK TREE POWER ESTIMATION AT REGISTER TRANSFER LEVEL (71) Applicant: Ansys, Inc., Canonsburg, PA (US)

(72) Inventors: Renuka Vanukuri, Cupertino, CA (US); Seema Naswa, Noida (IN)

(73) Assignee: Ansys, Inc., Canonsburg, PA (US)

( * ) Notice: Subject to any disclaimer, the term of this patent is extended or adjusted under 35 U.S.C. 154(b) by 0 days.

(21) Appl. No.: 16/430,584

(22) Filed: Jun. 4, 2019

Related U.S. Application Data (60) Provisional application No. 62/683,192, filed on Jun. 11, 2018.

(51) Int. Cl.
*G06F 17/50* (2006.01)
*G06F 30/327* (2020.01)
*G06F 1/28* (2006.01)
*G06F 1/06* (2006.01)
*G06F 30/398* (2020.01)
G06F 119/06 (2020.01)
G06F 30/3312 (2020.01)
G06F 30/337 (2020.01)

(52) U.S. Cl.
CPC .............. *G06F 30/327* (2020.01); *G06F 1/06* (2013.01); *G06F 1/28* (2013.01); *G06F 30/398* (2020.01); *G06F 30/337* (2020.01); *G06F 30/3312* (2020.01); *G06F 2119/06* (2020.01)

(58) Field of Classification Search
CPC .. G06F 30/327; G06F 30/3312; G06F 30/337; G06F 30/398; G06F 1/06; G06F 1/28; G06F 2119/06

USPC .......... 716/104, 108, 109, 113, 133; 703/16
See application file for complete search history.

(56) References Cited

U.S. PATENT DOCUMENTS

| | | | | |
|---|---|---|---|---|
| 8,365,113 | B1* | 1/2013 | Bhardwaj | G06F 30/30 716/106 |
| 8,640,066 | B1* | 1/2014 | Gupta | G06F 30/327 716/108 |
| 8,935,642 | B1* | 1/2015 | Bhardwaj | G06F 30/327 716/105 |
| 9,135,375 | B1* | 9/2015 | Sood | G06F 30/00 |
| 10,616,103 | B2* | 4/2020 | Folberth | G06F 1/10 |
| 10,684,642 | B2* | 6/2020 | Arp | H03K 19/1774 |
| 2006/0053395 | A1* | 3/2006 | Lai | G06F 30/39 716/114 |

(Continued)

OTHER PUBLICATIONS

Karpinski et al., "Optimcal Cuts and Partitions in Tree Metrics in Polynomial Time", arXiv:1212.3471v1, Cornell University, Dec. 14, 2012, pp. 1-9. (Year: 2012).*

*Primary Examiner* — Phallaka Kik
(74) *Attorney, Agent, or Firm* — Jones Day (57) ABSTRACT

Example systems and methods are disclosed for estimating power consumption by a clock tree in a register-transfer level (RTL) circuit design based on a previously generated reference gate-level circuit design. A plurality of regions within the clock tree structure of the reference gate-level circuit design are identified, where the plurality of regions are demarcated by one or more clock gating structures. A region-based clock model is generated that includes at least one clock constraint model for each identified region. The region-based clock model is used to synthesize the clock tree in the RTL circuit design for estimating power consumption.

21 Claims, 12 Drawing Sheets

(56) References Cited

U.S. PATENT DOCUMENTS

| | | | |
|---|---|---|---|
| 2014/0047402 A1* | 2/2014 | Terayama | G06F 30/392 |
| | | | 716/108 |
| 2014/0289685 A1* | 9/2014 | Ma | G06F 30/327 |
| | | | 716/102 |
| 2014/0289694 A1* | 9/2014 | Ma | G06F 30/3312 |
| | | | 716/129 |
| 2017/0212861 A1* | 7/2017 | Zhang | G06F 1/12 |
| 2017/0357746 A1* | 12/2017 | Rajaram | G06F 30/392 |
| 2019/0173781 A1* | 6/2019 | Folberth | H04L 45/48 |

\* cited by examiner

SYSTEMS AND METHODS FOR ENHANCED CLOCK TREE POWER ESTIMATION AT REGISTER TRANSFER LEVEL

This application claims priority to U.S. Provisional Application No. 62/683,192 filed on Jun. 11, 2018, titled "Systems and Methods for Enhanced Clock Tree Power Estimation at Register Transfer Level," the entirety of which is herein incorporated by reference.

TECHNICAL FIELD

The technology described herein relates generally to computer-aided design (CAD) tools and more particularly to systems and methods for enhanced clock tree power estimation in a register-transfer level (RTL) circuit design.

BACKGROUND

Figure 1:
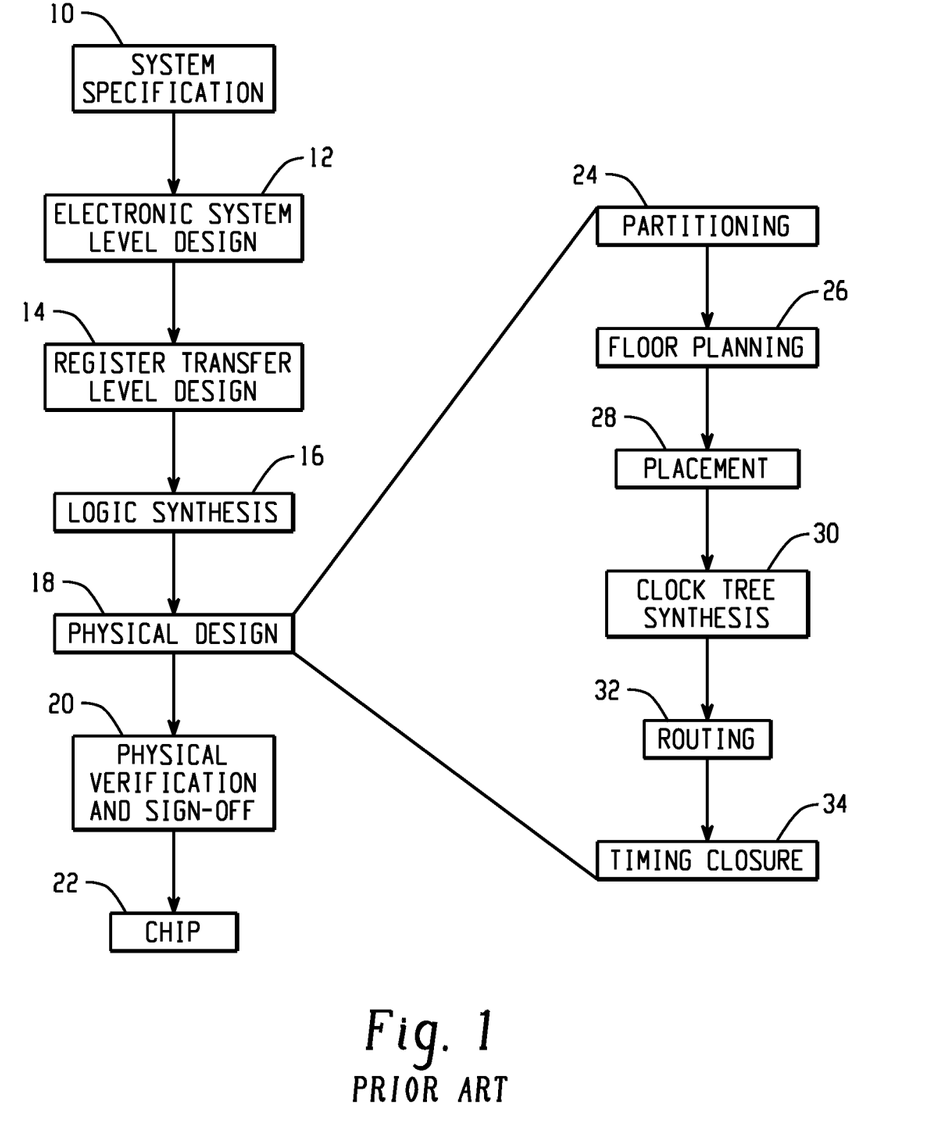
FIG. 1 depicts an example flow chart for integrated circuit (IC) design.

FIG. 1 depicts an example flow chart for integrated circuit (IC) design. As shown in FIG. 1, electronic system level (ESL) design 12 may be performed based on certain system specification/requirements 10 for a digital IC. Register-transfer-level (RTL) design 14 models the digital IC in terms of a flow of digital signals (data) between hardware registers, and logical operations performed on those digital signals. A logic synthesis process 16 turns an abstract form of desired circuit behavior at RTL into a design implementation in terms of logic gates. During a physical design process 18, circuit representations of components (e.g., devices and interconnects) of a circuit design are converted into an IC layout (e.g., geometric representations of shapes which, when manufactured in corresponding layers of materials, can ensure required functioning of the components).

The physical design process 18 usually includes several stages, such as partitioning 24 (e.g., dividing a chip into small blocks), floor planning 26 (e.g., identifying structures that should be placed close together and allocating space for the structures in such a manner as to meet goals of available space, required performance, etc.), placement 28 (e.g., assigning exact locations for various circuit components within the chip's core area), clock tree synthesis (CTS) 30 (e.g., insertion of buffers or inverters along clock paths of the design to achieve zero/minimum skew or balanced skew), routing 32 (e.g., including global routing that allocates routing resources for connections, and detailed routing that assigns routes to specific metal layers and routing tracks within the global routing resources), and timing closure 34 (e.g., modifying the design to meet timing requirements). After the physical design process 18, physical verification and sign-off 20 may be performed to determine a correct layout design for manufacturing the chip 22.

Power consumption has become important along with timing and area for integrated circuit design (e.g., for portable, battery-powered electronic devices and high performance servers). There are a number of known power management techniques, but the challenge in designing for low power consumption is usually related to the accuracy of power estimation tools. Accuracy of power estimation is generally good at later stages of circuit design (e.g., after the placement stage 28 and the routing stage 32 are completed), but then it may be too late to make architectural changes to the circuit design for reducing power consumption.

Power estimation at the RTL stage 14 can be more efficient for optimizing power consumption because at the RTL stage 14 there is enough flexibility to make high-impact changes to achieve low power consumption. However, power estimation at the RTL stage 14 may not be very accurate, as it is often difficult to evaluate the impact of the design changes on power consumption without going through the placement 28, the CTS stage 30, and the routing 32. Power estimation at the RTL stage 14 may also suffer accuracy loss because at the RTL stage 14, there is no or little knowledge of design structure and dynamic effects (e.g., glitches and poor modeling of clock and interconnect structures).

For example, design changes of clocks may be made at the RTL stage 14 for power reduction because clocks are the largest source of dynamic power consumption. Such changes at the RTL stage 14 to reduce clock power can affect physical characteristics of a clock tree structure. The clock tree structure, however, is built during the CTS stage 30 that is performed after the placement stage 28 is completed, as shown in FIG. 1. Thus, it is not easy to estimate accurately the impact of any design changes at the RTL stage 14 on clock power reduction.

Many known RTL power estimation systems estimate RTL clock power in a way that does not correlate with the gate clock power at the CTS stage. One reason for this is that many modern physical synthesis tools utilize a hybrid-approach when performing clock tree synthesis. As a result, the final gate-level clock tree constructed at the CTS stage neither resembles a balanced clock tree nor a balanced clock mesh, but is an amalgamation of balanced clock tree sections with intermediate buffer chains along sub-branches, intertwined with subsections of mesh. Many known RTL power estimation systems provide support for only a balanced tree to a balanced post-mesh clock network, and are not able to adequately handle these hybrid clock tree structures.

Therefore, methods and systems to model and accurately estimate clock power at the RTL stage are needed.

SUMMARY

Example systems and methods are disclosed for estimating power consumption by a clock tree in a register-transfer level (RTL) circuit design based on a previously generated reference gate-level circuit design. A plurality of regions within the clock tree structure of the reference gate-level circuit design are identified, where the plurality of regions are defined based on one or more clock gating structures. A region-based clock model is generated that includes at least one clock constraint model for each identified region. The region-based clock model is used to synthesize the clock tree in the RTL circuit design for estimating power consumption.

DETAILED DESCRIPTION

As shown in FIG. 1, a clock may be built at the CTS stage 30 for delivering a clock signal to a large number of flip-flops, latches, memories and other clocked devices that carry out logic or data storage operations (e.g., only in response to edges of received clock signals). For example, a flip-flop stores input data only in response to an edge (e.g., a rising edge or a falling edge) of the clock signal. A latch is transparent only at a particular level (e.g., logic high or logic low) of the clock signal.

At the RTL stage 14 (and also until the placement stage 28), a clock net may drive a very large number of clocked devices. In the physical world, it is infeasible for a clock driver to drive that many loads. Hierarchies of buffers are added at the CTS stage 30 to fan out the clock from its source to the clock pins of certain sinks.

Figure 2:
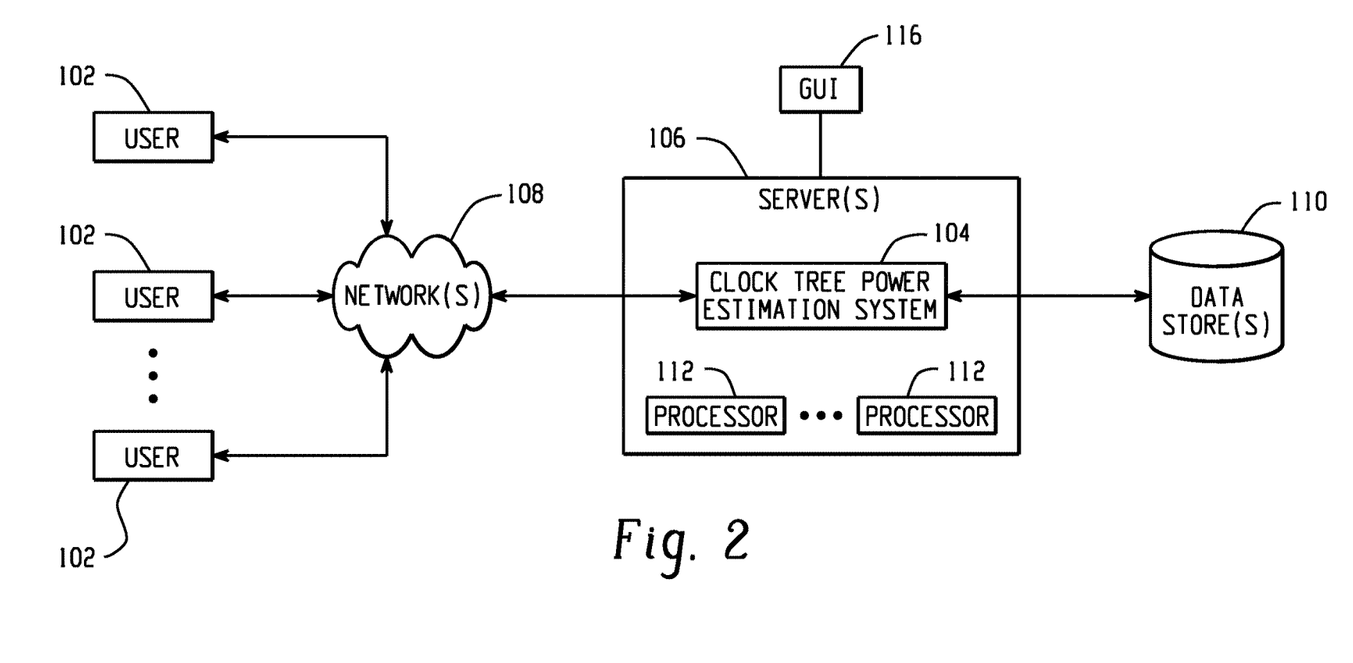
FIG. 2 depicts an example computer-implemented environment where users can interact with a clock tree power estimation system.

FIG. 2 depicts an example computer-implemented environment where users 102 can interact with a clock tree power estimation system 104 hosted on one or more servers 106 through a network 108. The clock tree power estimation system 104 can assist the users 102 for accurately predicting system power (e.g., at RTL). Specifically, the clock tree power estimation system 104 constructs a virtual clock tree at RTL with predictable power accuracy using one or more region-based physical clock power models constructed from a reference gate-level (i.e., post-CTS) design, as described in more detail below.

As shown in FIG. 2, the users 102 can interact with the clock tree power estimation system 104 in a number of ways, such as over one or more networks 108. The clock tree power estimation system 104 may assist one or more of the users 102 to construct region-based physical clock power models from a reference gate-level design through a graphical user interface 116. One or more servers 106 accessible through the networks 108 can host the clock tree power estimation system 104. The one or more servers 106 implement one or more data processors 112. For example, the data processors 112 can be configured for parallel computing. The one or more servers 106 can also contain or have access to one or more data stores 110 for storing input data and/or output data for the clock tree power estimation system 104.

In certain embodiments, the clock tree power estimation system 104 builds one or more region-based physical clock power models and uses the region-based physical clock power model(s) at RTL for power estimation (e.g., for high-speed processor designs that involve hybrid-clock networks, such as a combination of clock mesh and balanced clock trees). A characterization process from a reference gate-level design may be carried out to generate one or more region-based clock models, as described in more detail below, and then the clock model(s) can be applied to multiple RTL designs. For example, the reference design can be an older version of a current design. As another example, the reference design may be of a similar design style as the current design at a same technology node.

Figure 3:
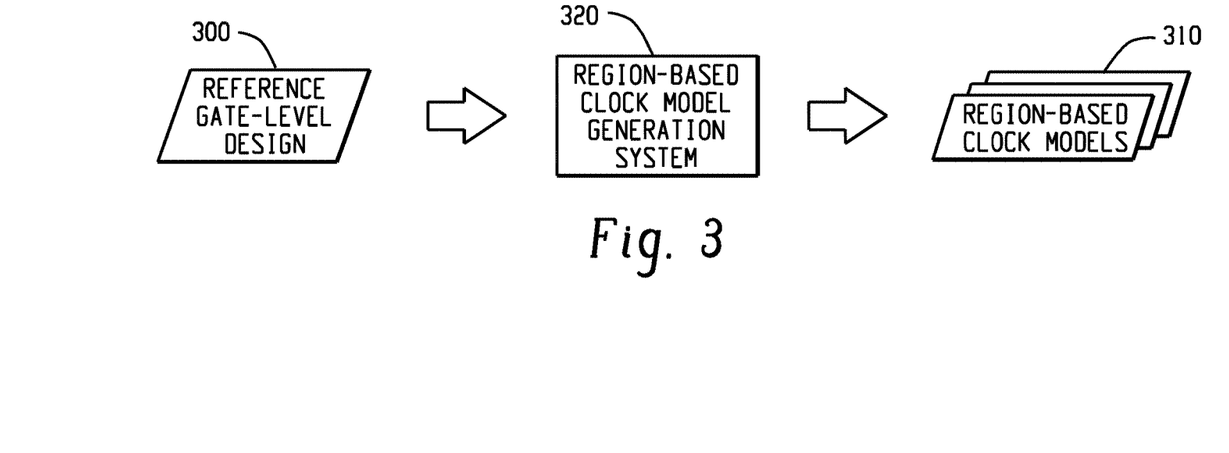
FIG. 3 depicts an example of a region-based clock model generation system.

As illustrated in FIG. 3, a region-based clock model generation system 320 may be used to generate one or more region-based clock models 310 from the reference gate-level design 300. The region-based clock model generation system 320 may, for example, include software stored on a non-transitory computer readable medium and executed by a processor, such as in the clock tree power estimation system 104 of FIG. 2. In an embodiment, a region-based clock model 310 is generated for each clock frequency in the reference gate-level design 300.

In embodiments, the clock distribution network from the gate-level netlist of the reference gate-level design 300 is divided into multiple regions in the region-based clock model 310, with each region being defined based on (e.g., demarcated by) the levels assigned to clock gating elements (i.e., clock gating structures). Levels may, for instance, be assigned to clock gating elements following a levelization of the clock network. During levelization of the clock network to define the regions, clock buffers and inverters may be ignored and only clock gating elements, such as integrated clock gating (ICG) cells and multiplexers, are considered. Each define region thus represents the cloud of logic sharing similar clock activity.

If there are multiple clock gates at a given level, each clock gate may have a unique clock activity. But for the purpose of define clock tree regions, the difference in the clock activity seen at any level due to the existence of multiple clock gates with different enable conditions may be ignored. Instead, a relative ranking may be assigned for the clock activity based on how far away the clock activity is from the clock source. The region closest to the clock source may be given the highest rank and the region farthest from the clock source may be given the lowest rank. This is done in view of the fact that the regions closest to the clock source operate at higher frequencies than the regions farthest from the clock source. Each successive clock gate reduces the clock frequency by a variable factor less than one. In addition, the clock tree regions may be further subdivided into clusters based on the fan-out they drive.

Figure 4:
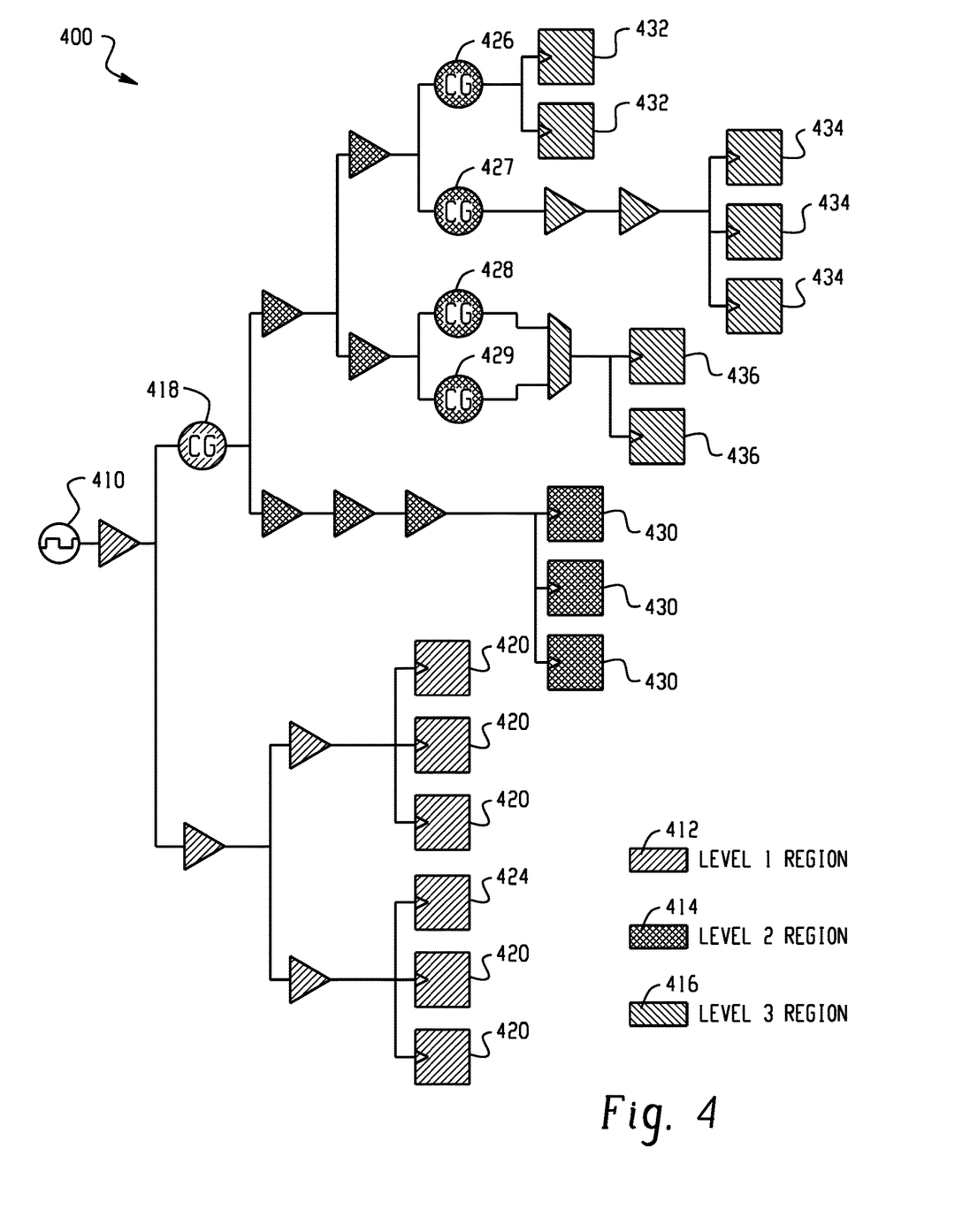
FIGS. 4 and 5 depict examples of a gate-level clock tree structure divided into multiple regions and clusters.
Figure 5:
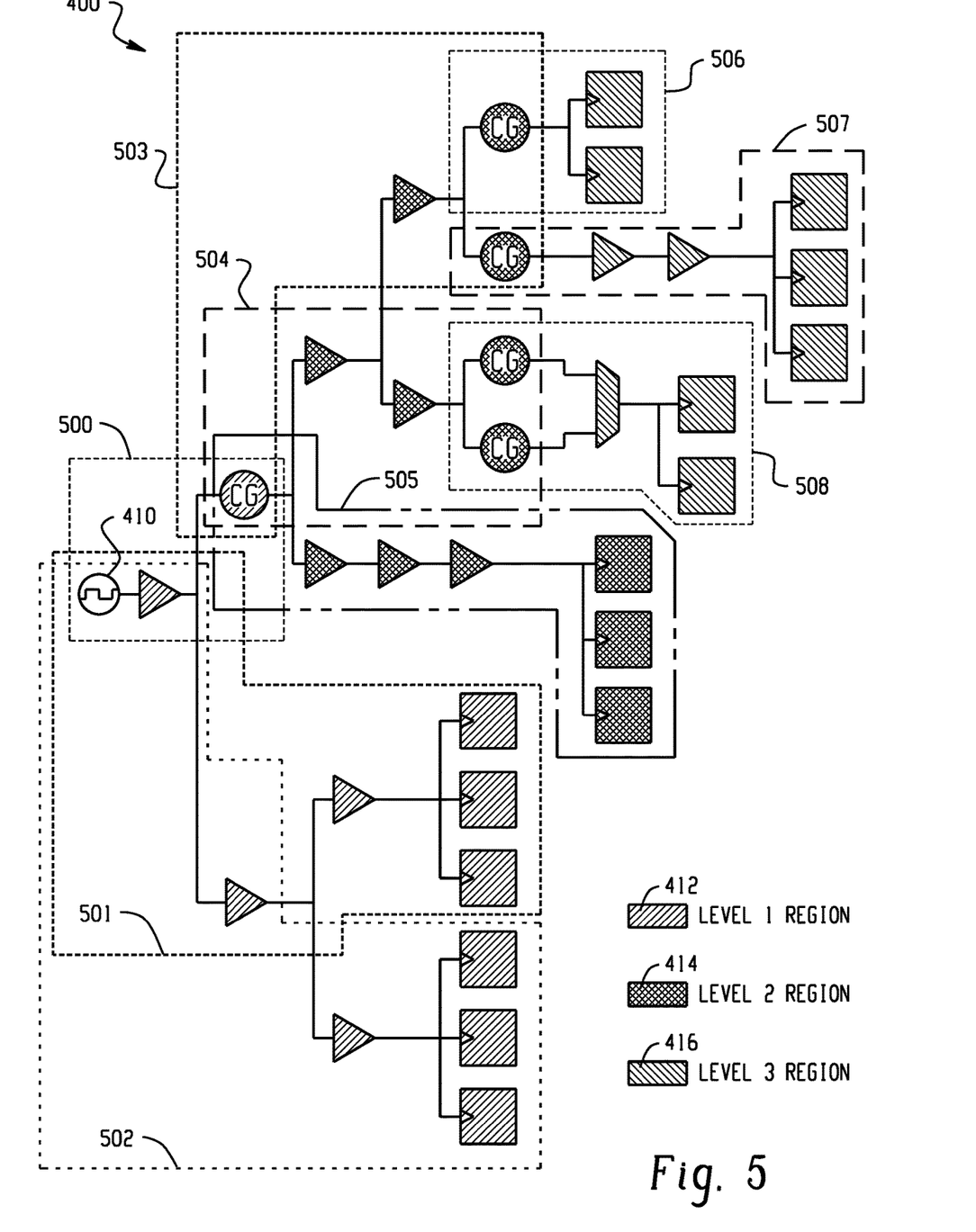

An example of a gate-level clock tree structure 400 for a single clock frequency 410 in a reference gate level design that is divided into multiple regions and clusters is set forth in FIGS. 4 and 5. FIG. 4 illustrates the example gate-level clock tree structure 400 divided into multiple regions 412, 414, 416. FIG. 5 illustrates the example gate-level clock tree structure further divided into multiple clusters.

With reference first to FIG. 4, the illustrated example is divided into three regions: a level 1 region 412, a level 2 region 414, and a level 3 region 416. The clock tree elements within each region are differentiated in the illustration using different fill patterns identified in a key at the bottom right of the drawing. Specifically, the clock elements in the level 1 region 412 are identified by a diagonal line fill pattern, the clock elements in the level 2 region 414 are identified by a cross-hatched fill pattern, and the clock elements in the level 3 region 416 are identified by a densely dotted fill pattern.

As shown in FIG. 4, each of the regions has a starting node that is either a clock source 410 or a clock gating element (CG) and end nodes that are either a clock gating element or a sequential element. The intermediate nodes are buffers and/or inverters carrying the clock signal from the start nodes to the end nodes. Specifically, the level 1 region 412 starts with the clock source 410 and has two branches— one branch ending in a clock gating element 418 and the other branch ending in multiple sequential elements (e.g., flip-flops) 420, 424. The level 2 region 414 starts with clock gating element 418. A first branch of the level 2 region 414 ends in multiple clock gating elements 426-429, and a second branch of the level 2 region 414 ends in multiple sequential elements 430. The level 3 region 416 includes four clock gating element starting nodes 426-429 and ends in multiple sequential elements 432, 434, 436. The level 1 region, operating at the highest frequency, consumes most of the clock tree power. The level 2 region, operating at a frequency lower than the level 1 region but higher than the level 3 region, consumes less power than the level 1 region and more power than the level 3 region. The level 3 region, operating at the lowest frequency, consumes the least power. By modeling clock tree constraints at each of these regions, the variation in the clock tree constraints for high power regions vs low power regions are captured more accurately in the clock power model. Reusing the region-based clock tree constraints during RTL Power Estimation for performing the Clock Tree Synthesis ensures that the constraints required to handle high power clock regions vs low power clock regions are satisfied more accurately.

With reference now to FIG. 5, the clock tree regions 412, 414, 416 are further divided into multiple clusters 500-508 based on one or more constraints, such as maximum fan-out or maximum capacitance. The different clusters 500-508 are identified in FIG. 5 by dotted boxes, with a dotted box enclosing each cluster. As illustrated, each of the clock tree regions 412, 414, 416 is subdivided into one or more clusters. The subdivision of clock tree regions into clusters may be based on one or more constraints, such as a maximum number of fan-outs. For instance, in the illustrated example, the clock tree regions 412, 414, 416 are subdivided into nine clusters based on a maximum fan-out of the clock source drives. Thus, any region that drives more than a maximum number of clock-gates and/or sequential elements is subdivided into multiple clusters.

Specifically, the level 1 region 412 in the illustrated example ends in six sequential elements and a clock-gating element. Based on the maximum fan-out constraint, the level 1 region 412 is divided into three clusters 500-502. In this way, clusters 501 and 502 each drive a maximum fan-out of three sequential elements. And cluster 500 drives a maximum fan-out of one clock gating element. The level 2 region 414 is divided into three clusters 503, 504 and 505 such that cluster 505 drives the maximum of three sequential elements, while 503 and 504 each drive a maximum of two fan-outs. The level 3 region 416 drives seven sequential elements, and thus must be divided into three clusters 506-508, with 506 and 508 driving a maximum fan-out of two and 507 driving a maximum fan-out of three.

It should be understood that in other examples, the clock tree regions could be subdivided into clusters based on different constraints and/or one or more additional constraints. For instance, in certain embodiments, instead of using the maximum fan-out, either the maximum capacitance or a combination of the maximum capacitance and maximum slew or a combination of the maximum fan-out and maximum slew or other such criterial could be used to divide the clock tree region into multiple clusters.

Figure 6:
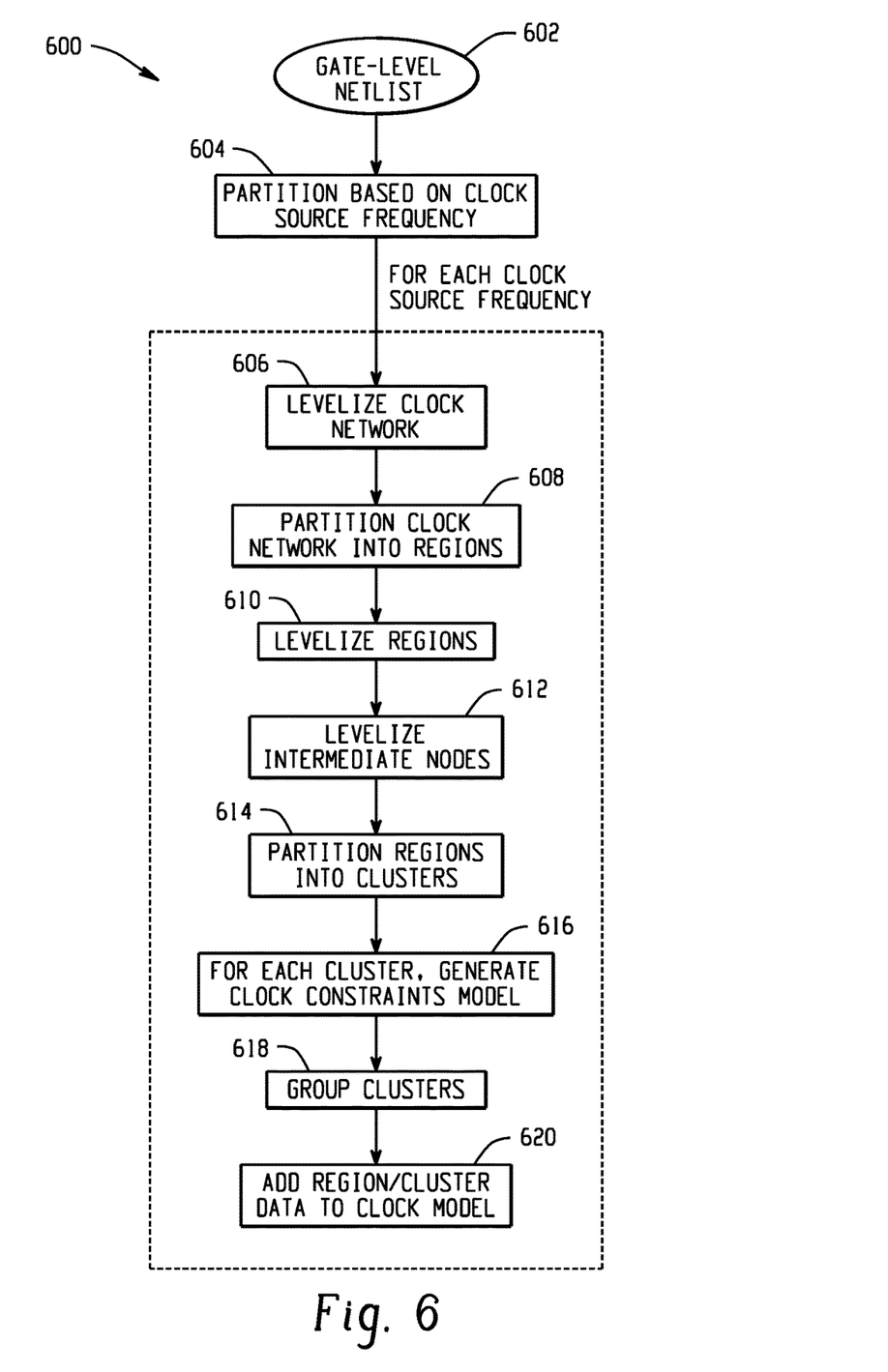
FIG. 6 is a flow diagram of an example method for generating a region-based clock model.

FIG. 6 is a flow diagram showing an example method 600 for generating one or more region-based clock models. The method 600 may, for example, be performed by software stored in a non-transitory computer-readable medium and executed by one or more processors, such as the clock tree power estimation system 104 of FIG. 2 and/or the region based clock model generation system of FIG. 3.

At step 602, a gate-level netlist is received for a reference gate-level design. The clock network of the gate-level netlist is partitioned at step 604 based on clock source frequency.

Steps 606-620 are then repeated one or more times to generate a region-based clock model for each clock frequency in the gate-level netlist.

At step 606, the gate-level clock network for the particular clock frequency is levelized. The clock source is assigned a level identification number starting with zero. All the clock gating elements and the sequential elements driven by the clock source at level zero, through intermediate buffers and/or inverters, are assigned a level identification number of one. The clock gating elements and sequential elements driven by level one clock source elements are given a level identification number two. Thus, after levelization of the clock circuit, all the clock source elements (i.e., primary clock input and/or clock gating elements) are assigned a level identification number that is one greater than their driving clock source.

Then, at step 608, the levelized gate-level clock network is partitioned into clock tree regions, for example as described above with reference to FIGS. 3 and 4. In embodiments, each region will include one or more start nodes that are either a clock source or a clock-gating element, and one or more end nodes that are either a clock gating element or a sequential element. Each clock tree region may also include one or more intermediate nodes that include buffers and/or inverters carrying the clock signal from the start node(s) to the end node(s).

At step 610, the clock tree regions are levelized, such that the first region starts from the clock source (e.g., the clock input pin or clock net.) The second region (if any) starts from any end nodes of the first petition that are clock-gating elements, the third region (if any) starts from any clock-gating end nodes of the second region, and so on, until a region with end nodes of only sequential elements is reached. Any intermediate nodes are levelized at step 612. During this step, intermediate buffers and inverters carrying the clock signal from the clock source (i.e., primary clock input or the clock gating element) to end nodes (i.e., clock gating elements and/or sequential elements) are assigned level identification numbers. The buffer/inverter driven directly by the clock source is assigned a level identification number starting with zero. The buffer/inverter driven by level zero inverter/buffer is assigned a level identification number one, and so on until the end node in the clock tree region is reached. The levelization within the clock tree regions is performed to gather the clock depth constraints.

Figure 8:
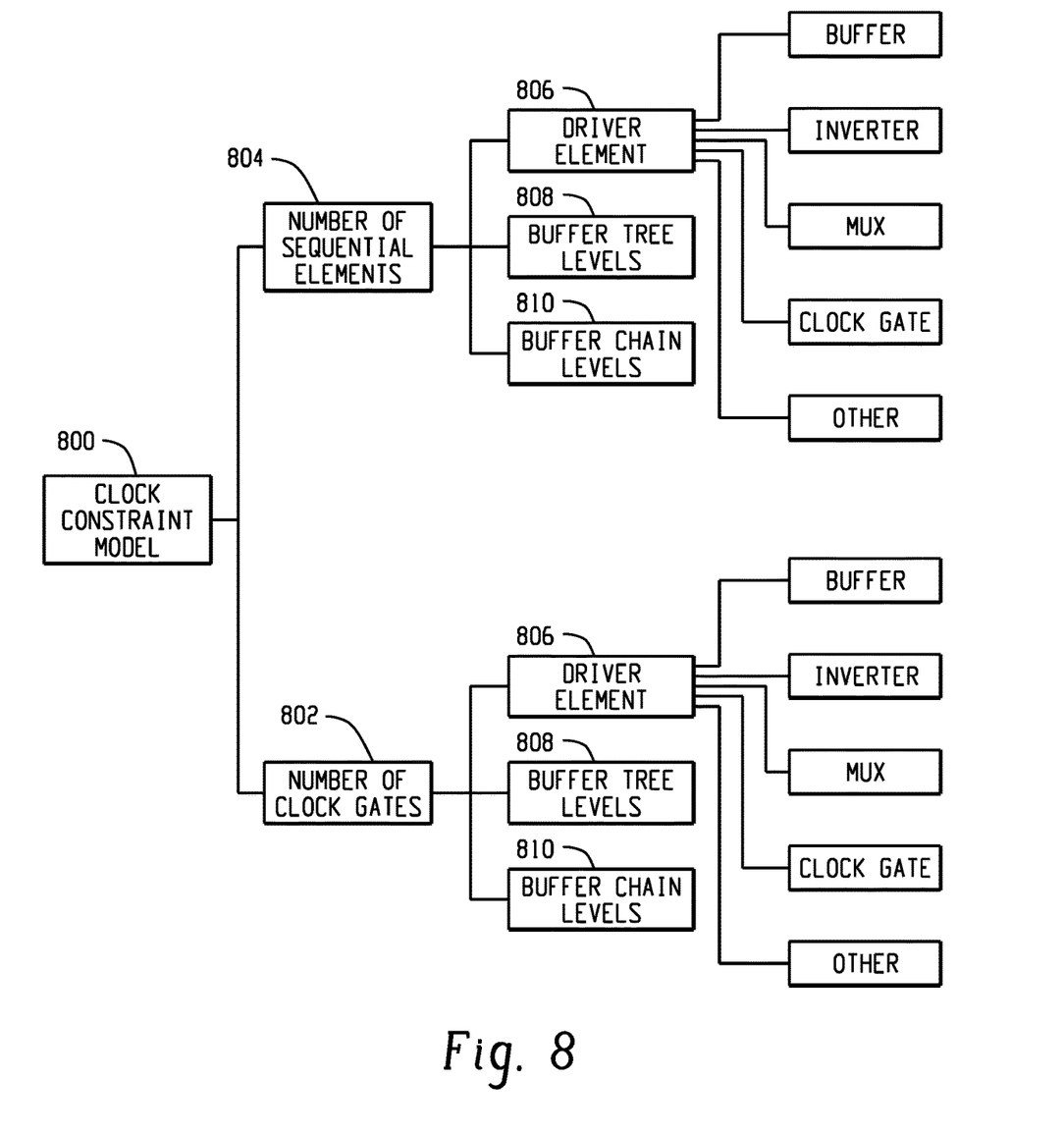
FIG. 8 is a block diagram of an example clock constraint model.

At step 614, the levelized clock tree regions are further divided into clusters based on one or more constraints, for example as described above with reference to FIGS. 3 and 5. For each cluster, a clock constraint model is generated at step 616, for example as shown in FIG. 8 described below. The clock constraint model for each cluster may, for example, include statistics related to buffers/inverters used at a particular level, design characteristics such as wire delay and/or library characteristics of the buffers/inverters such as minimum/maximum fan-out, minimum/maximum slew, minimum/maximum capacitance, etc.

At step 618, the clusters sharing similar load constraints (such as maximum fan-out and/or maximum capacitance) are grouped together to generate a single statistical clock-constraint model for that load constraint. The clock constraint models generated for all the load constraints within a region are grouped together to generate a single clock constraint model for that region. The clock constraint models generated for all the regions belonging to the same clock frequency domain are then grouped together to generate a global clock constraint model for that clock frequency domain. These hierarchical clock constraint models are then added to the region-based clock model at step 620, for example as shown in FIG. 7.

Figure 7:
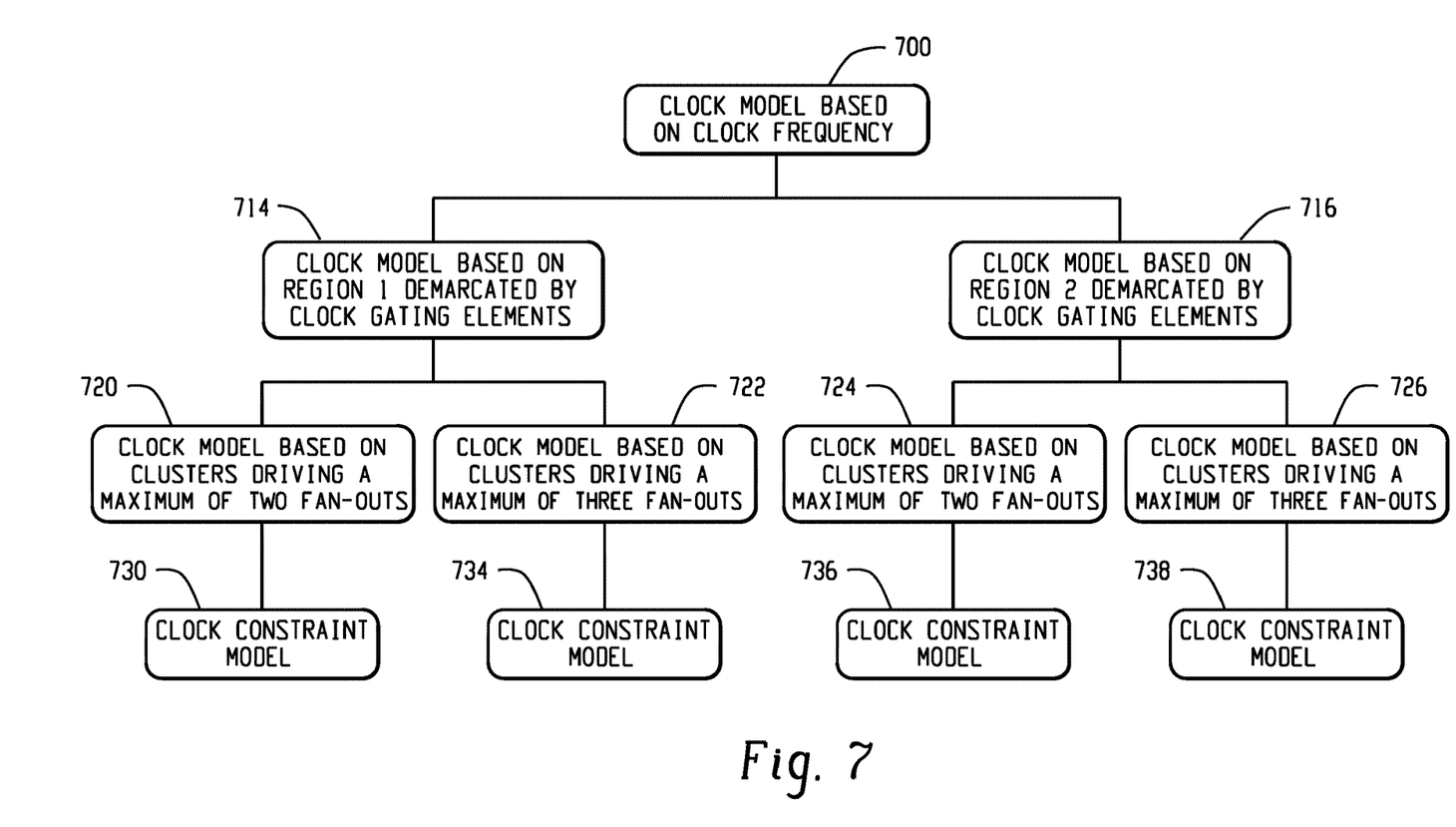
FIG. 7 is a block diagram of an example region-based clock model.

FIG. 7 is a block diagram of an example region-based clock model 700. The top tier of the clock model 700 identifies the clock source from the gate-level netlist on which the clock model is based. As explained above, a different region-based clock model 700 may be generated for each clock source frequency in the gate-level netlist of the reference gate-level design. The next tier of the clock model 700 includes the clock constraint model(s) for two branches 714, 716 that identify two clock-gate regions in the gate-level clock tree structure. For instance, with reference to the example shown in FIG. 4, the first branch 714 of the clock model 700 would identify the level 1 region 412, and the second branch 716 of the clock model 700 would identify the level 2 region 414. The next tier of the region-based clock model 700 includes the clock constraints model(s) for various clusters under region 714 and region 716. The clock-gate region 714 (i.e., region 412 in FIG. 4) is divided into two additional branches—one branch identifying the cluster 720 (i.e., cluster 500 in FIG. 5) driving a maximum of two fan-outs, and the other branch identifying the cluster 722 (i.e., cluster 501 and cluster 502 in FIG. 5) driving a maximum of three fan-outs. In addition, the clock-gate region 716 (i.e., cluster 414 in FIG. 4) is divided into two branches, identifying the cluster 724 (i.e., cluster 503 and 504 in FIG. 5), driving a maximum of two fan-outs and the cluster 726 (i.e., cluster 505 in FIG. 5) driving a maximum three fan-outs. For each cluster, aggregate statistics such as the driver element, minimum/maximum buffer tree levels, minimum/maximum buffer chain levels, minimum/maximum fan-out, minimum/maximum capacitance, minimum/maximum input transition, minimum/maximum output transition, may be captured within the clock constraints model 730, 734, 736 and 738. An example of a clock constraint model 730, 734, 736, and 738 is shown in FIG. 8.

FIG. 8 is a block diagram of an example clock constraint model 800. The example clock constraint model 800 includes a first branch 802 that identifies the number of clock gates in the cluster or region, and a second branch 804 that identifies the number of sequential elements in the cluster or region. Each branch 802, 804 further identifies additional clock constraints, such as the driver element 806 (e.g., buffer, inverter, multiplexer, clock gate, other), maximum and minimum buffer tree levels 808 and maximum and minimum buffer chain levels 810. This model is reused at the RTL level during clock tree synthesis to derive a clock distribution network such that the constraints captured in the clock model are met.

Figure 9:
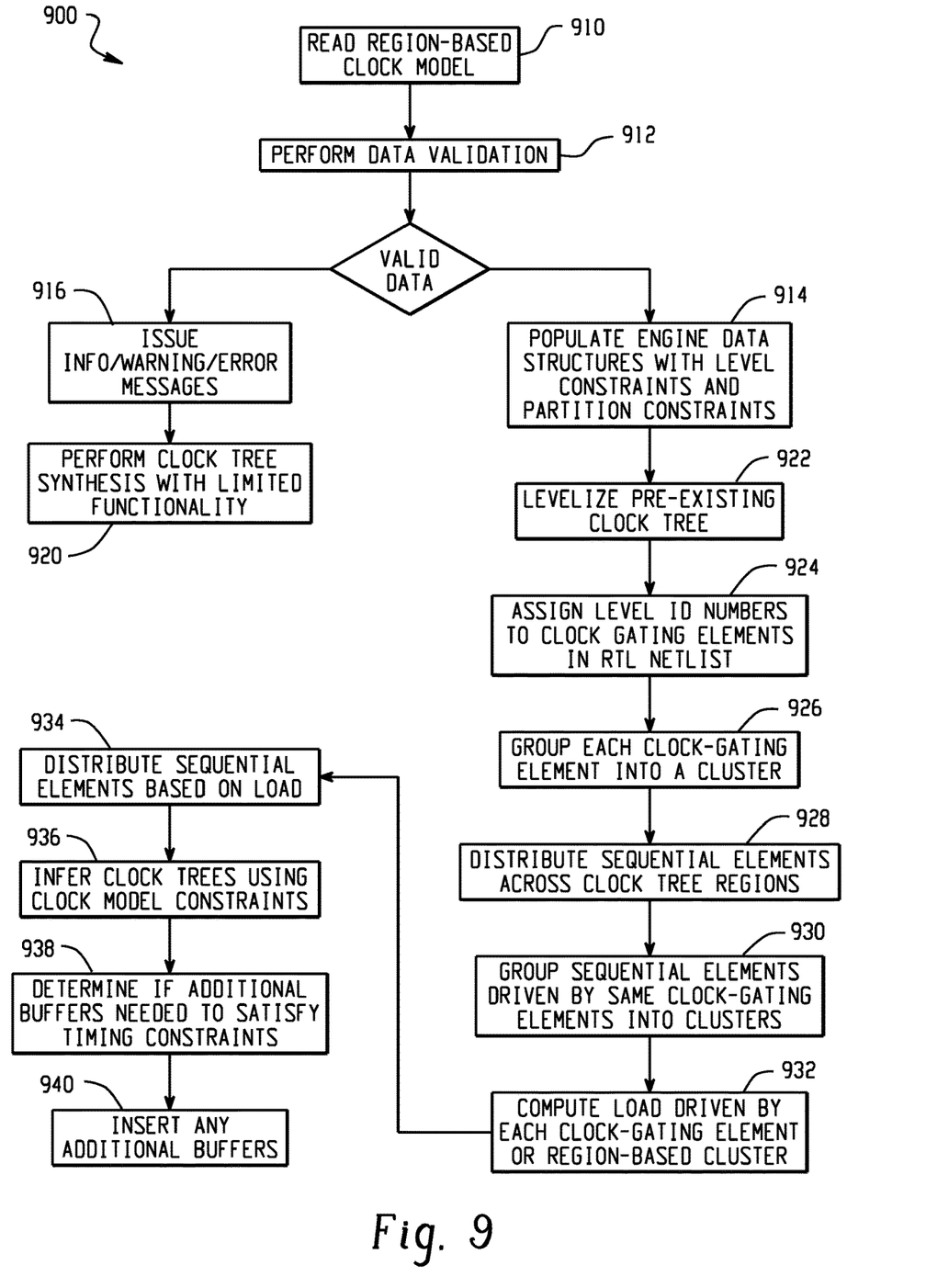
FIG. 9 is a flow diagram of an example method for performing clock tree synthesis for power estimation of an RTL design.

FIG. 9 is a flow diagram of an example method 900 for performing clock tree synthesis for power estimation of an RTL design using the region-based clock models described herein. The method 900 may, for example, be performed by software stored on a non-transitory computer readable medium as executed by a processor, such as in the clock tree power estimation system of FIG. 2.

At step 910, the method 900 receives the region-based clock model(s). The region-based clock model(s) may be validated at step 912. If the model(s) is valid, then the method 900 proceeds to step 914. Otherwise, if the region-based clock model(s) is determined to be invalid, then a warning message is generated at step 916, and the method may proceed to step 920 to perform RTL clock tree synthesis without the benefit of the region-based clock model(s) using one of various known methods.

At step 914, engine data structures are populated with clock tree constraints from the region-based clock model(s). The pre-existing clock tree from the RTL design is levelized at step 922. Clock gating elements in the RTL netlist are assigned level identification numbers at step 924 to define the clock regions based on the level numbers assigned. The clock-source is assigned a level identification number zero. All the clock gating elements driven by the clock-source at level zero are assigned a level identification number one. The clock gating elements driven by the clock-gate elements at level one are assigned a level identification number of two and so on. The levelized RTL clock tree may contain multiple clock-gating elements acting as multiple clock sources within a region. Each of the clock-gating element is grouped into a cluster of its own at step 926. All the sequential elements, belonging to the clock tree network, are distributed across various clock tree regions, based on the region to which their driver clock source belongs to at step 928. Sequential elements driven by the same clock gating element are grouped into the same cluster at step 930. The total load driven by each of the clock gating elements or region-based cluster is computed at step 932. The total load is the number of sequential elements driven by the cluster. If the clock-source or the clock gating element cannot drive the total load (i.e., the sequential elements belonging to its cluster), then the sequential elements belonging to a cluster are distributed across multiple groups of varying fan-outs at step 934. The multiple fan-out groups, such as groups with maximum fan-out of two, groups with maximum fan-out of three, groups with maximum fan-out of four are created as per the region-based clock model that was generated from the reference gate level netlist. Clock trees to drive the various groups are inferred using the load constraints of clock model associated with the RTL region and the RTL cluster at step 936. Once the clock tree is generated to satisfy the load constraints, a determination is made with regards to adding additional buffers to satisfy the timing constraints at step 938. This determination is based on the clock tree constraints captured from the gate level netlist for the region and the cluster. A chain of buffers may be inserted to satisfy the timing constraints at step 940.

Figure 10:
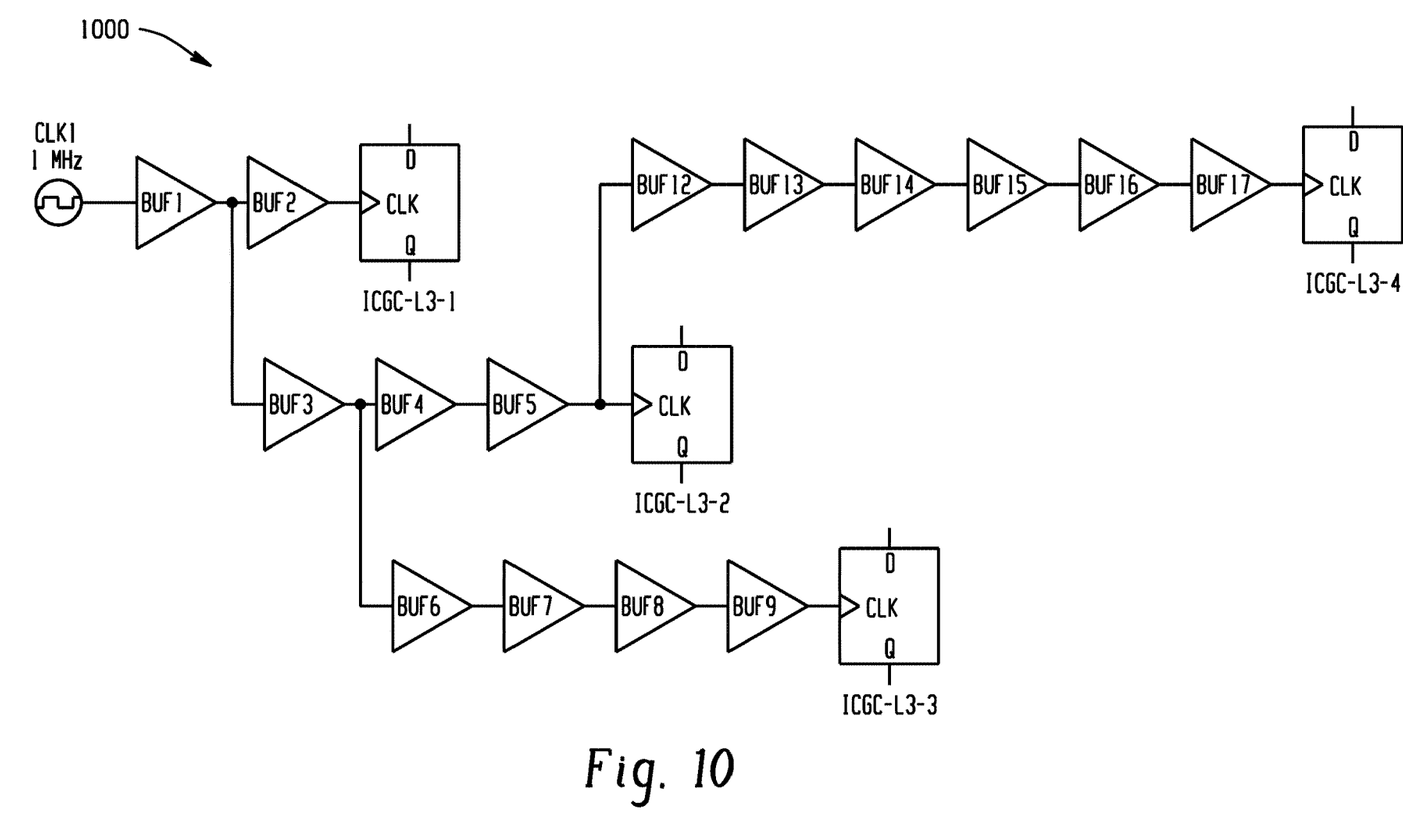
FIGS. 10-12 illustrate examples of RTL clock tree synthesis.
Figure 11:
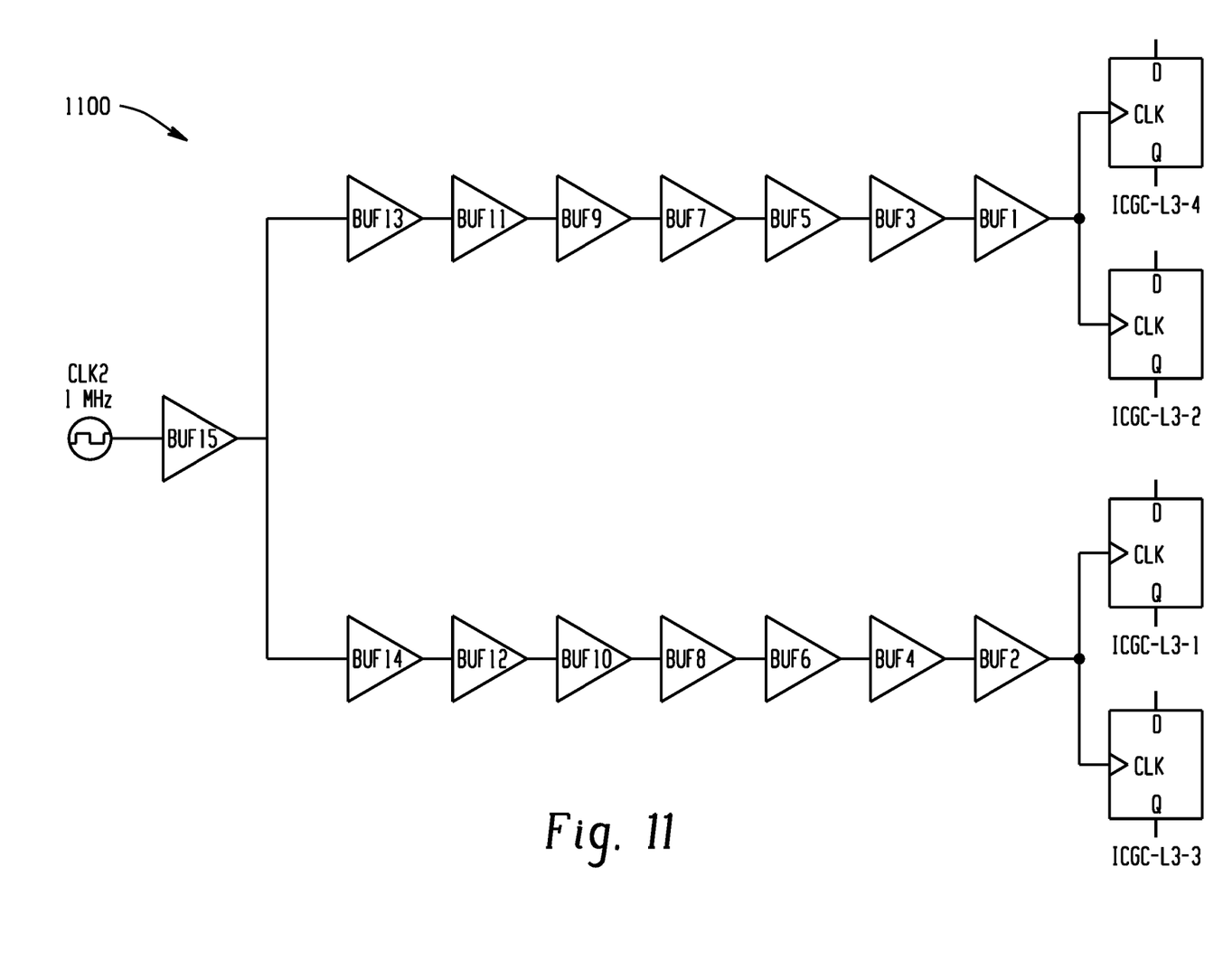
Figure 12:
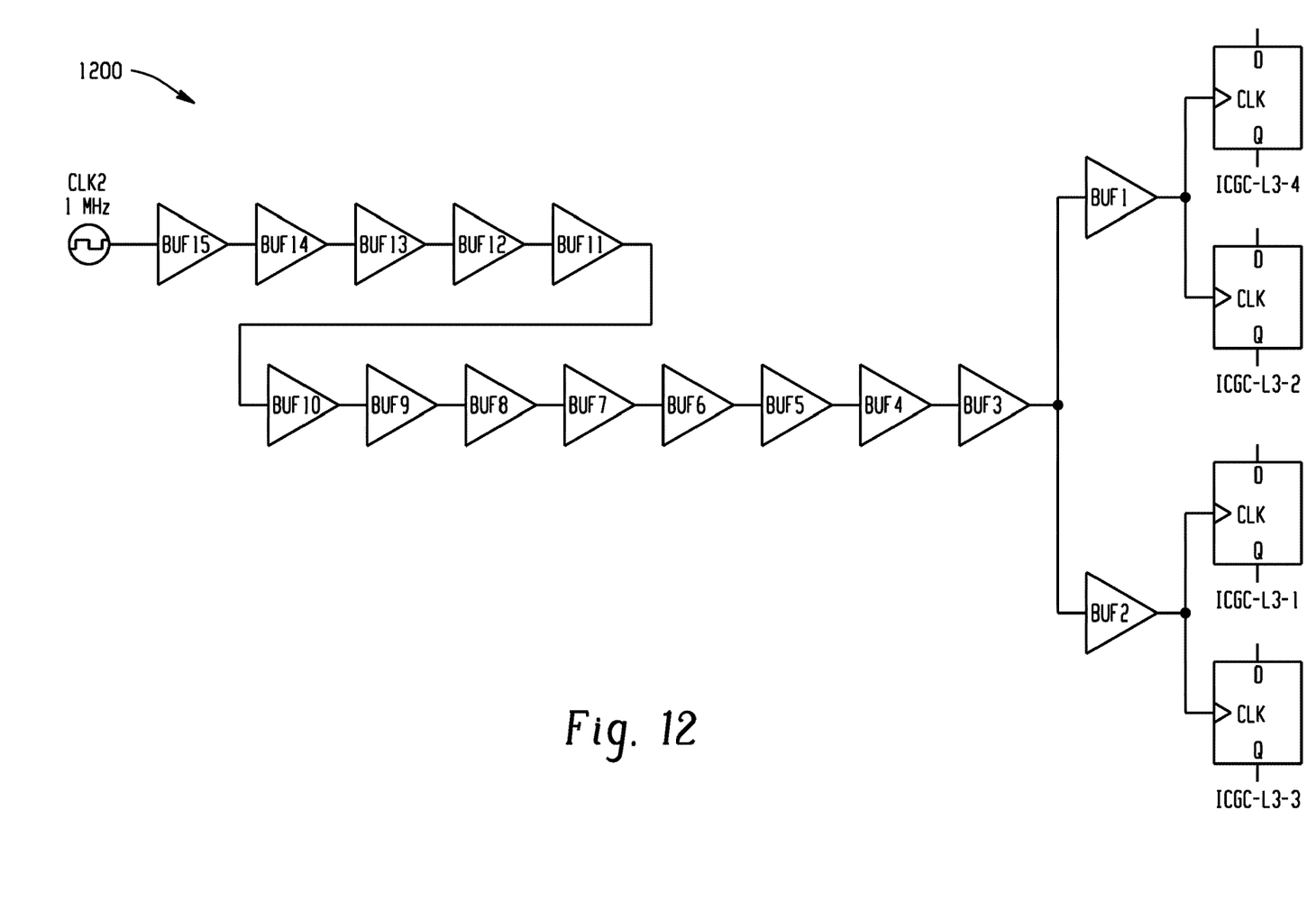

FIGS. 10, 11, and 12 illustrate examples of RTL clock tree synthesis for clock tree power estimation using the method of FIG. 9. FIG. 10 is a circuit diagram showing a desired clock tree implementation 1000 for an example RTL netlist. That is, the diagram shown in FIG. 10 is the gate-level clock circuit 1000 that will result from physical synthesis of the RTL design. FIGS. 11 and 12 illustrate two examples of clock tree structures 1100, 1200 that may result from application of the RTL clock tree synthesis method of FIG. 9 used for clock power estimation of the same RTL design. The structure in FIGS. 11 and 12 uses two buffers to satisfy the load constraints and the remaining thirteen buffers to satisfy the timing constraints based on the region based clock constraints model generated for the hypothetical structure shown in FIG. 10. In FIG. 10, the terminal buffers driving the clock-gates and/or sequential elements are satisfying a load constraint of two fan-outs and the intermediate buffers are satisfying the timing constraints for a particular arrangement of sequential elements on the physical IC block. Comparing FIG. 10 with FIGS. 11 and 12, it can be seen that, for estimating clock tree power at RTL, the RTL clock tree synthesis 1100, 1200 need not generate the same clock tree topology as the gate-level physical synthesis 1000. For estimating clock tree power at RTL, it is sufficient that the RTL synthesis (e.g., as set forth in FIG. 9) match the buffer cells and buffer count within a region define based on the clock source or clock-gating element(s) and/or sequential elements, while honoring the set of constraints from the region-based clock model. This is based on the fact that the cone of buffers driven by the output of any clock gate shares similar clock activity.

The variation in the buffer topology 1000 from gate-level physical synthesis results from the need to satisfy the timing constraints. Assuming that a similar buffer topology can satisfy the timing constraints for an RTL design sharing the same clock enable signal, it is sufficient if the RTL clock tree synthesis satisfies the buffer count and buffer level constraints of the region-based clock model. Thus, by retrofitting/remapping the RTL partitions onto gate-level partitions, and satisfying the load and cell constraints, the gap in clock power correlation between the gate and RTL designs may be reduced.

Figure 13:
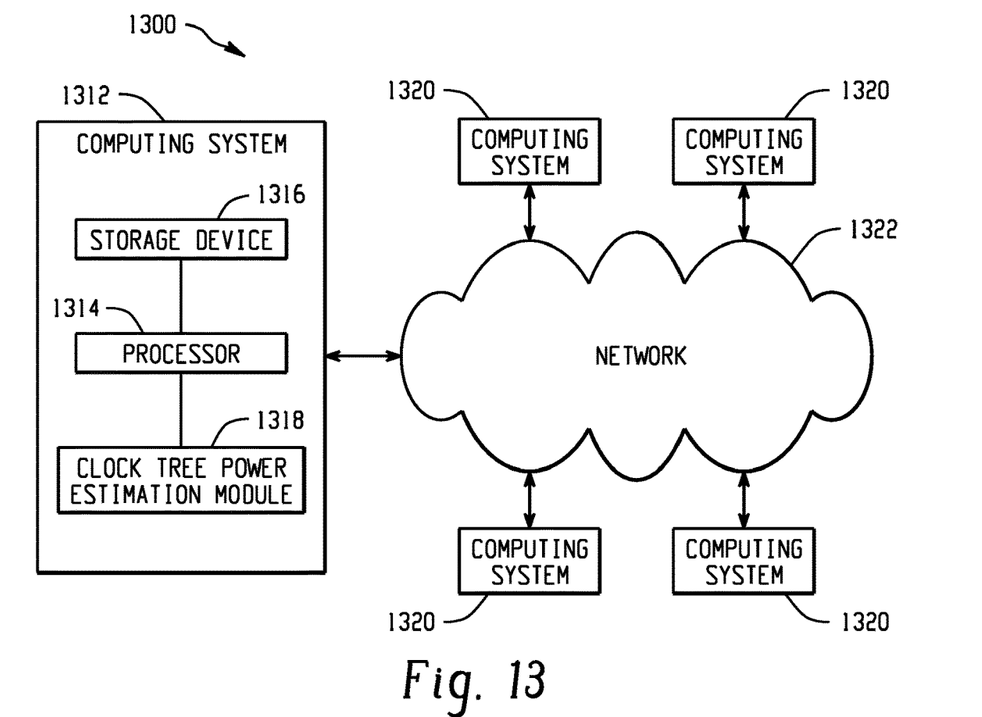
FIG. 13 depicts a block diagram of an example system for clock tree power estimation.

FIG. 13 depicts an example diagram showing a system 1300 for clock tree power estimation. As shown in FIG. 13, the system 1300 includes a computing system 1312 which contains a processor 1314, a storage device 1316 and a clock tree power estimation module 1318. The computing system 1312 includes any suitable type of computing device (e.g., a server, a desktop, a laptop, a tablet, a mobile phone, etc.) that includes the processor 1314 or provide access to a processor via a network or as part of a cloud based application. The clock tree power estimation module 1318 includes tasks (e.g., as described herein) and is implemented as part of a user interface module (not shown in FIG. 13).

Figure 14:
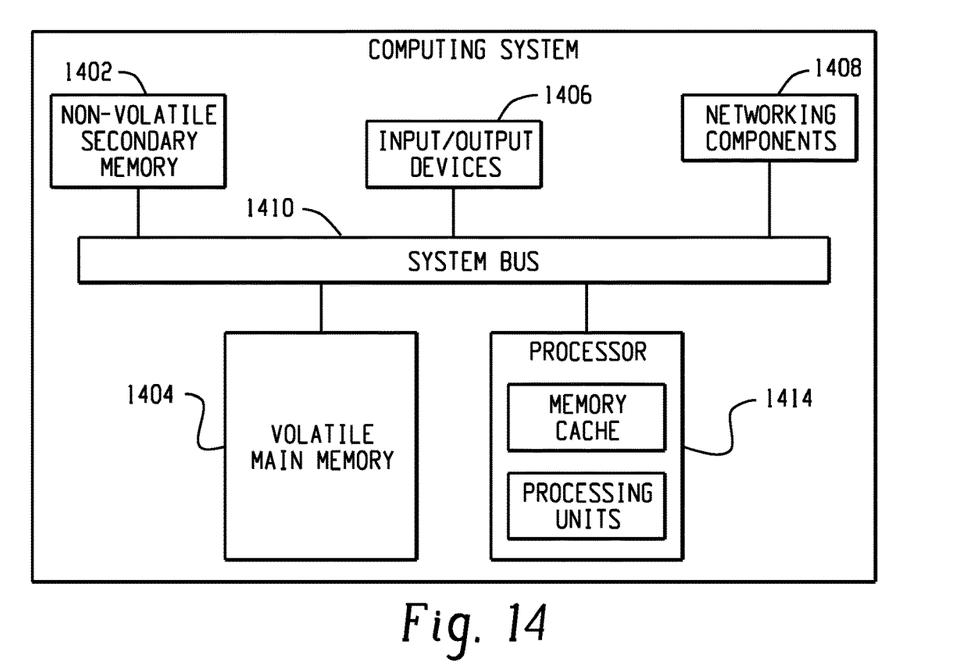
FIG. 14 depicts a block diagram of an example computer system for clock tree power estimation.

FIG. 14 depicts an example diagram showing an example computing system 1400 for clock tree power estimation. As shown in FIG. 14, the computing system 1400 includes a processor 1414, memory devices 1402 and 1404, one or more input/output devices 1406, one or more networking components 1408, and a system bus 1410. In some embodiments, the computing system 1400 includes the clock tree power estimation module, and provides access to the clock tree power estimation module to a user as a stand-alone computer.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It is claimed:

1. A method for estimating power consumption in a register-transfer level (RTL) circuit design based on one or more reference gate-level circuit designs having a clock tree structure for a clock frequency, comprising:
   identifying, by the processor, a plurality of regions within the clock tree structure of the reference gate-level circuit design, wherein each of the plurality of regions includes a destination clock gating structures or destination sequential element to receive a clock input signal from a clock source or a source clock gating structure;
   generating, by the processor, a region-based clock model that includes a clock constraint for each identified region; and
   synthesizing, by the processor, a clock tree in the RTL circuit design using the region-based clock model for estimating power consumption.

2. The method of claim 1, wherein for each clock frequency in the clock tree structure of the reference gate-level circuit design,
   further identifying, by the processor, one or more clusters within each of the plurality of regions, wherein each cluster is identified based on one or more load constraints,
   wherein the region-based clock model includes a clock constraint model for each identified cluster.

3. The method of claim 2, wherein the one or more load constraints include a maximum number of fan-outs.

4. The method of claim 2, wherein the one or more load constraints include a maximum capacitance.

5. The method of claim 2, wherein the region-based clock model includes data structures associated with each of a plurality of clusters defined within a particular region.

6. The method of claim 2, wherein further identifying one or more clusters comprises:
   comparing a region metric with the load constraint to determine whether that region must be sub-divided to meet the load constraint;
   when that region must be sub-divided, identifying a plurality of the one or more clusters based on that region.

7. The method of claim 1, wherein the regions include a plurality of level regions, wherein each of the level regions is associated with a different frequency, a first region operating at a frequency of an initial clock source.

8. A system for estimating power consumption by a clock tree in a register-transfer level (RTL) circuit design, comprising:
   one or more data processors;
   one or more computer-readable storage mediums encoded with instructions for commanding the one or more data processors to execute steps that include:
      receiving, by a processor, a previously generated reference gate-level circuit design having a clock tree structure;
      for each clock frequency in the clock tree structure of the reference gate-level circuit design,
         identifying, by the processor, a plurality of regions within the clock tree structure of the reference gate-level circuit design, wherein each of the plurality of regions includes a destination clock gating structure or destination sequential element to receive a clock input signal from a source or a source clock gating structure;
         generating, by the processor, a region-based clock model that includes at least one clock constraint model for each identified region; and
         using, by the processor, the region-based clock model to synthesize the clock tree in the RTL circuit design for estimating power consumption.

9. The system of claim 8, wherein for each clock frequency in the clock tree structure of the reference gate-level circuit design,
   further identifying, by the processor, one or more clusters within each of the plurality of regions, wherein each cluster is identified based on one or more load constraints,
   wherein the region-based clock model includes a clock constraint model for each identified cluster.

10. The system of claim 9, wherein the one or more load constraints include a maximum number of fan-outs.

11. The system of claim 9, wherein the one or more load constraints include a maximum capacitance.

12. The system of claim 9, wherein the region-based clock model includes data structures associated with each of a plurality of clusters defined within a particular region.

13. The system of claim 9, wherein further identifying one or more clusters comprises:
   comparing a region metric with the load constraint to determine whether that region must be sub-divided to meet the load constraint;
   when that region must be sub-divided, identifying a plurality of the one or more clusters based on that region.

14. The system of claim 8, wherein the regions include a plurality of level regions, wherein each of the level regions is associated with a different frequency, a first region operating at a frequency of an initial clock source.

15. A non-transitory computer-readable storage medium comprising instructions for which when executed cause a processing system to execute steps comprising:
   receiving, by a processor, a previously generated reference gate-level circuit design having a clock tree structure;
   for each clock frequency in the clock tree structure of the reference gate-level circuit design,
      identifying, by the processor, a plurality of regions within the clock tree structure of the reference gate-level circuit design, wherein each of the plurality of regions includes a destination clock gating structure or destination sequential element to receive a clock input signal from a clock source or a source clock gating structure;
      generating, by the processor, a region-based clock model that includes at least one clock constraint model for each identified region,
      identifying, by the processor, clusters within one or more of the regions, wherein each of the clusters is identified by subdividing a region based on a load constraint; and
      using, by the processor, the region-based clock model to synthesize the clock tree in the RTL circuit design for estimating power consumption, wherein synthesizing the clock tree includes accessing a model associated with each of the clusters to determine a power consumption of that cluster.

16. The non-transitory computer-readable storage medium of claim 15, wherein for each clock frequency in the clock tree structure of the reference gate-level circuit design, wherein the region-based clock model includes a clock constraint model for each identified cluster.

17. The non-transitory computer-readable storage medium of claim 15, wherein the load constraint indicates that regions be subdivided into the plurality of clusters when driving more than a maximum number of fans-out.

18. The non-transitory computer-readable storage medium of claim 15, wherein the load constraint includes a maximum capacitance.

19. The non-transitory computer-readable storage medium of claim 15, wherein the region-based clock model includes data structures associated with each of the plurality of clusters defined within a particular region.

20. The non-transitory computer-readable storage medium of claim 15, wherein the regions include a plurality of level regions, wherein each of the level regions is associated with a different frequency, a first region operating at a frequency of an initial clock source.

21. The non-transitory computer-readable storage medium of claim 15, wherein further identifying one or more clusters comprises:
   comparing a region metric with the load constraint to determine whether that region must be sub-divided to meet the load constraint;
   when that region must be sub-divided, identifying a plurality of the one or more clusters based on that region.

* * * * *